July 24, 1962 H. H. HOWARD ETAL 3,045,826
FILTER DEVICE
Filed July 28, 1958 2 Sheets-Sheet 1

Inventors.
Herbert H. Howard &
Paul A. Smith.
By Merriam, Lorch & Smith.
Attys.

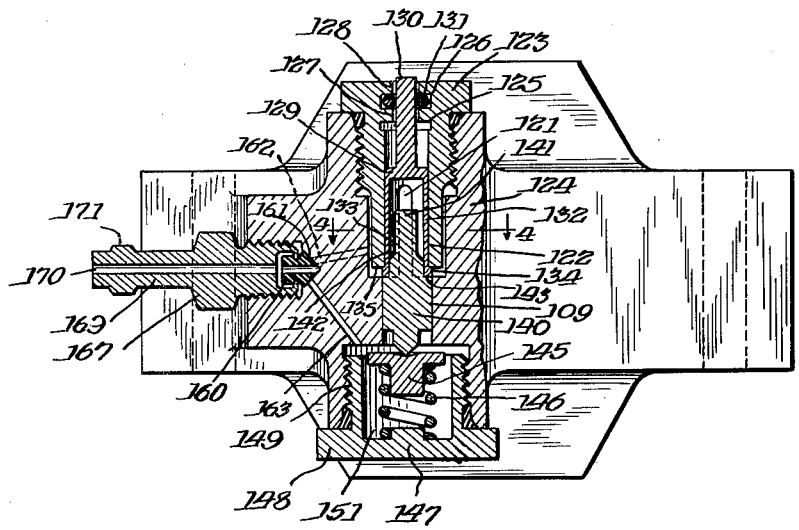

United States Patent Office 3,045,826
Patented July 24, 1962

3,045,826
FILTER DEVICE
Herbert H. Howard, Los Angeles, and Paul A. Smith, Tarzana, Calif., assignors to Permanent Filter Corporation, Los Angeles, Calif., a corporation of California
Filed July 28, 1958, Ser. No. 751,407
5 Claims. (Cl. 210—90)

This invention relates to filter constructions of a type designed for filtering and removing foreign and contaminating particles from fluids passed therethrough and also for automatically indicating when filtering conditions have been impaired by the accumulation of filtered particles in the filter mechanism itself.

Many and varied uses for filter mechanisms which screen or remove particles of minute size, usually called micronic particles, are known. These uses are, to a large extent, in connection with the operation of servo-mechanisms used particularly in connection with the firing and guiding of missiles and rockets and particularly with such servo-mechanisms as are required in connection with the operation of aircraft. The foregoing, however, represent only certain of the uses to which the apparatus here to be described may be put and serve merely to exemplify the utility of the device as related illustratively to one particular field of use.

The filtering mechanism here to be described becomes important because it provides ways and means by which even the most minute particles, illustratively particles even as small as two microns, can be filtered from a fluid supply to be passed from a source to any desired number of utilization points prior to its re-circulation. The filter apparatus is located between an input and various utilization points. The fluid at the input usually is supplied under pressure and its temperature may range between wide limits. The fluid after passing through the filter which removes contaminants of selected size, then passes to the outlet and to the apparatus operated.

The filtering component per se is usually in the form of a sintered metallic element. It is formed of particulated metals, such as bronze, sintered into a composite mass through which the fluid is circulated. The sintered particles, while forming what to the eye appears to be a substantially completely solid element, nonetheless is actually a multiplicity of microscopically small particles sintered or bonded together to form the filter wall but capable of passing the fluid directly therethrough. The particles making up the sintered unit, as is known in the art, are each of substantially uniform size and shape and, for illustrative purposes, may be considered as essentially formed as spheres which, when joined together by the sintering or more or less of a fusion action, form themselves into a filter wall. The sintering actually forms minute passages around each individual metal sphere and those adjacent thereto. These passages form an almost innumerable number of entrances and exits through the filter medium and yet, due to the fineness of the particles and the resultant microscopic dimensions of the passages formed, while generally permitting fluid passage with minimum restrictions, nonetheless, are so small that contaminants of almost microscopic size are precluded from flowing through the filter even despite the inlet fluid pressure at the inlet being in a direction to force fluid from the entrance of the mechanism through to the outlet.

In the particular form in which the invention here is constituted provisions are made for an indicating mechanism for providing registrations as to whether or not the fluid intended to be passed through the filter component is actually moving as desired or whether, due to the filter accumulating and screening, as it were, contaminants from the circulated fluid, the pressure available at the outlet has been substantially reduced so that even though operating fluid may be available at the outlet the reduction in pressure at which this fluid can be supplied to various working components may be sufficient to impair such operation and thus work an overall damage to the system. Operation of the indicating mechanism is controlled in accordance with pressure differentials between the inlet and the outlet so that with operation of the failure indicating mechanism to indicate the degree of contaminant absorption.

Other objects of the invention are those of providing an improved filter construction where filter replacements may be made with a minimum inconvenience.

Still other objects of the invention are those of providing simplified constructions of indicator devices, for warning of danger points in the operation due to pressure reduction resulting from filter absorptions.

Other objects of the invention are those of providing an improved filter construction of simple structural features and, although indicating a danger condition due to filter impairment as a result of its efficient functioning, nonetheless maintains the overall operation at reduced efficiency following the indication of impaired operation so that at least some fluid is fed to operate the mechanism at all times and the chance of damage to the operated mechanism is reduced since the warning of failure can be set to precede the actual critical point.

Still other objects of the invention are those of providing a filter apparatus of a highly efficient type which can have its main operating component removed for replacement or cleaning with minimum incovenience and which may be manufactured and sold profitably at reasonable cost due to the lack of critical components therein contained.

Other objects, of course, naturally will suggest themselves to those skilled in the art to which the invention is directed when the following description and claims are read in connection with the accompanying drawings in which:

FIG. 2 is a view, partly in section, of the filter shown by FIG. 1, taken along the plane of the lines 2—2 and looking in the direction of the arrows;

FIG. 3 is a section through the filter sump of the structure of FIG. 1, taken on the line 3—3, looking in the direction of the arrows; and FIG. 4 is a section on the line 4—4 of FIG. 2, and shows particularly the arrangement of the cantilever arms on the alarm valve.

Figure 1:
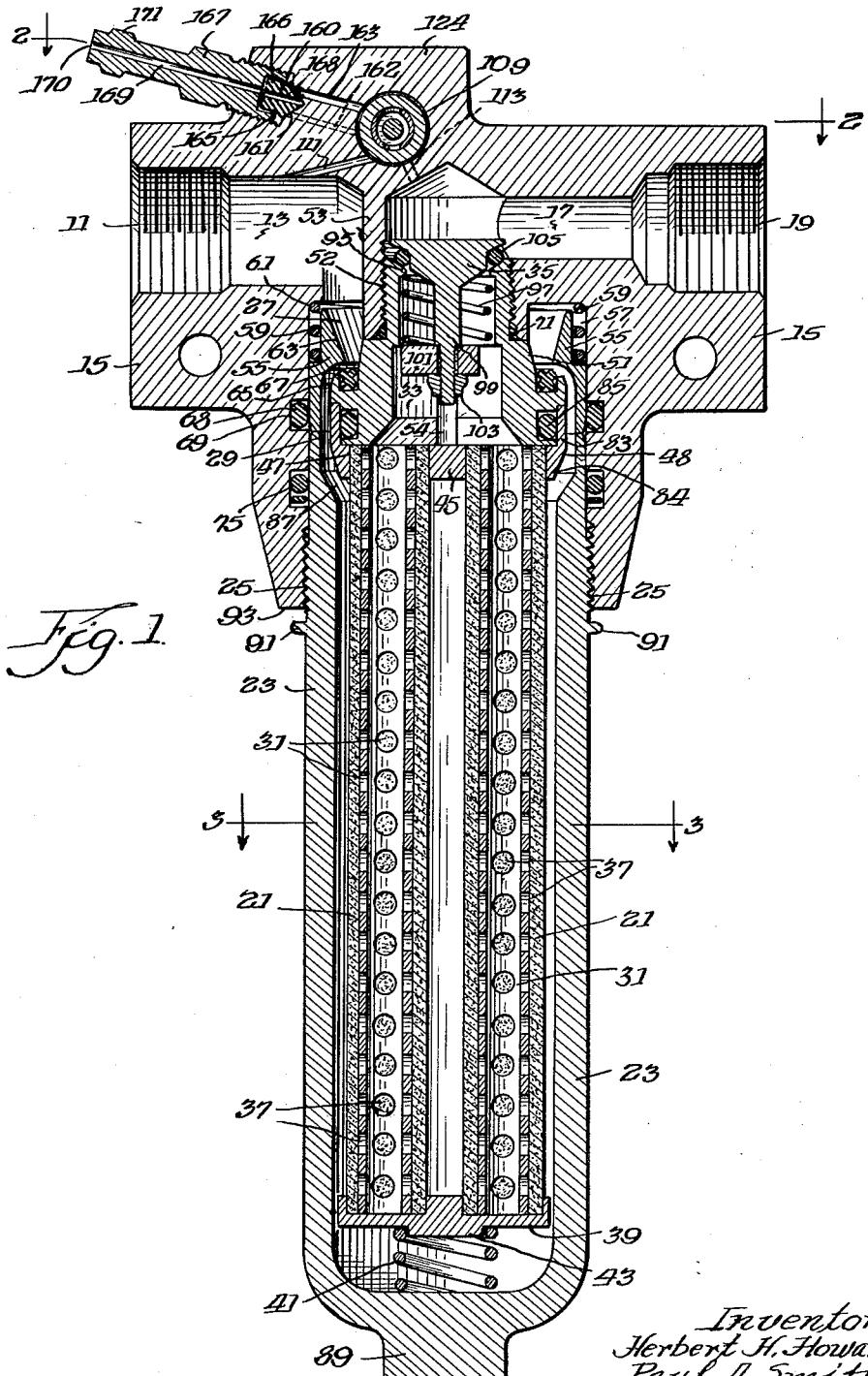
FIG. 1 is a sectional view in elevation of one preferred form of filter mechanism.

Referring now to the drawings for a further understanding of this invention, fluid under pressure is supplied at the inlet port 11 and flows inwardly into the inlet chamber 13 formed into one side of the upper portion 15 of the casing also contains an outlet chamber 17 leading to an outlet port 19 into which chamber the fluid supply is fed after passing through filtering elements 21. The filters 21 are held in nested form (see FIG. 3 and description to follow) and are suitably supported within a sump 23 which is screw-threaded to the upper portion 15 of the casing at 25.

It will be described later herein in further detail, but suffice it for the moment to point out that the fluid entering into the chamber 13 passes through the inlet passage 27 and the entrance port 29 into the interior of the sump 23. After the fluid passes through the filter elements 21 within the sump 23 it can flow outwardly through the tubular elements 31 into the valve chamber 33 to be passed through the poppet valve 35 into the outlet chamber 17. As can be seen particularly from FIGS. 1 and 3, the tubular filter elements 21 which are formed preferably as sintered bronze elements of the character hereinbefore described fit tightly about the external wall of the tubular elements 31, which tubular elements have arranged longitudinally thereof and at various positions about the periphery thereof a multiplicity of openings 37 into which liquid passing into the sump and through the filter elements 21 can flow.

The lower end of the tubular elements, looking at the arrangement as at FIG. 1, is tightly sealed off by means of a nested cover plate 39 which is spring pressed against the group of filters and tubular elements by means of the spring 41 held in the bottom of the sump and caused to press outwardly about the bossed section 43 of the cover plate 39. The upper portion of the combination of supported filter elements 21 with the internal tubes is pressed tightly against the lower surface of a header 45 having an upstanding flange 83 and a perforate disc 47 has openings which provide a passageway into the valve chamber 33. The tubes are sealed in the openings of the disk in any desired fashion and in some cases it has been found that the complete nest may be sintered into one mass. The disk rests (when positioned) against the shoulder 48 of the sleeve 51.

The sleeve 51 fastens into the main body section 15 by the threading means 52, as indicated. Tightening into the body is easily provided by the spanner notches 54 in the lower recessed one (due to circular formation only a single notch is shown by the drawings).

The upper portion 15 of the casing has a separating partition 53 to isolate the inlet chamber 13 from the outlet chamber 17. The inlet chamber, it will be appreciated, is formed generally as a drilled hole extending inwardly from one side of the casing for a distance sufficient to communicate with the inlet passageway 27 leading into the entrance port 29. The separating partition 53 is thus in a form of a depending wall circling one end of the outlet chamber except for the region where it would actually cut through the central region of this chamber.

The depending wall and the sleeve 51 form one wall of the inlet passage 27 and the entrance port 29. The inner wall of the sleeve forms the boundary wall of the valve chamber 33 within which the poppet valve 35 is held. The opposite wall of the inlet passage 27 and the entrance port 29 is formed from a sleeve member 55 which is of double tubular form, having at its upper end an offset collar to provide a spring receiving space 57 adapted to holding pressure spring 59. The spring 59 bears at its upper end against the top of the receiving space 57 at the terminating portion of wall 61 of the inlet chamber 13. At its lower end, the spring 59 bears against a shoulder on the sleeve 55 and is held between the recess wall and the casing 15, normally to move the sleeve downwardly.

The inward contour of the sleeve 55 is inwardly sloped, as indicated at 63, to form the inlet passage 27. The lower portion of the sleeve 53 has an outwardly extending foot 65 of circular formation into which the so-called "quad" ring 67 is seated. Normally, with the sleeve 55 pressed downwardly by the spring 59, when the elements are assembled, the inwardly sloped wall is caused to press tightly against the upper surface of the "quad" ring 67, thereby to form a seal and close off the inlet passage 27 from the entrance port 29 leading into the sump. Force exerted by the spring and pressing the sleeve 55 downwardly the inwardly sloped wall 63 is caused to bear upon the "quad" ring. This force is augmented by the force exerted by fluid in the chamber 13, under pressure, acting upon the inwardly sloped surface of the sleeve so that, under normal conditions, and barring the attachment of the sump to the assembly, the downwardly moved sleeve 55 forms a seal to close the outlet from the inlet.

Leakage around the outside of the sleeve 55 and the upper portion of the internal opening in the portion 15 of the casing is prevented by the O ring 68 held in the recess 69 on the inner wall thereof. The outer periphery of the sleeve 55 and the internal opening in the casing 15 are approximately the same diameter so that a substantially tight fit is formed. Then, with the positioning and flattening of the O ring 68, a fluid-tight seal is made about the outer wall of the sleeve as well as upon the inlet passage due to the "quad" ring. To maintain a completely tight fit between the separating partition or wall and the outer surface of the sleeve 53 which leads into the outlet chamber 17, it is usually desirable to provide a leakproof connection which has, herein illustrated as the packing 71, extending around the periphery of the two meeting members.

Below the upper portion of the casing 15 as already mentioned, the sump 23 is attached by threading it to the upper section at 25. The sump casing forms more or less of a seal with the outer wall when threaded into the upper portion of the casing 15. It is adapted to abut the lower portion of the sleeve 55 and when so doing forces the sleeve 55 upwardly, against the force exerted by the spring 59, so as to lift the sleeve from the "quad" ring 67 and provide the entrance port 29 to the sump proper. Leakage is prevented upon attachment of the sump 23 to the casing 15 by providing O rings 75 in a suitable recess, formed in the inner wall of the upper portion of the casing 15 against which O rings the outer wall of the sump, when threaded into the casing, is pressed.

The sump, when it is attached to the casing, includes the filtering elements and the tubular elements therein contained. These elements are preferably assembled by first forming the sintered filter element 21 as a tubular element through which the tubular reinforcing element 31 is passed. So formed, a plurality of tubular filter elements with internal tubes positioned therein, may be rested and supported in the nested cover plate 39, as can be seen more particularly by FIG. 3. The end cover plate locates the outer edge of the filters by recesses 77 formed therein.

The upper portion of the filter and tube assembly is fitted into holes formed in the base plate cover disk 45 of the collar 48, as already mentioned, whose outer periphery is an upturned flange element 83 having an inwardly tapered wall 84. The assembly serves to hold the filter tubes 21 and their central reinforcing elements 31, as did the plate 39 at the opposite ends. The tubes protrude through the disk and form openings at one side thereof. The flange 83 is then adapted to overlap the lower portion of the sleeve 51 and to be sealed thereto by pressing against the O rings 85. The depending skirt 84 forms one wall of the sump inlet passage when the complete unit is assembled. The complete assembly of the cover plate 39, supporting the filters 21 and the tubular members 31 therein contained, is spring-pressed upwardly by the conventionally indicated spring 41. Accordingly, with the tightening of the sump 23 to the upper portion of the casing 15 by screwing the two members together, if necessary, under force exerted by turning the nut 89 on the lower portion of the casing until the ears 91 abut the lower edge 93 of the casing 15, the sleeve 55 is moved upwardly and the inlet passage into the sump opened. This occurring, fluid entering at the inlet port 11, can pass through the inlet chamber 13, the inlet passage 27, into the inlet port 29 and thence through the inlet passage 87 of the sump and through the sump into the filters and then the tubular members to pass upwardly into the valve chamber 33.

The sleeve 51 in the valve chamber 33 is formed with an inwardly extending notch or wall 95 against which a compression spring 97 is held so that the force exerted by the spring is in a downwardly direction, looking at FIG. 1. The poppet valve 35 has a long lower stem 99 which has a sector-shaped yoke 101 suitably secured toward its lower end by the nut 103 which is threaded thereon. The yoke extends for substantially the full width of the chamber 33 over a portion of the periphery of the valve stem. The remaining portion is of lesser width and provides a passage around the yoke for fluid flowing into the valve chamber 33. The arrangement of the larger diameter portion which substantially closes off a part of the chamber 33 provides a surface against which the force of the spring 97 can be applied normally to hold the valve 35 seated upon the inwardly sloped upper part of the sleeve 51. The generally conically shaped inner wall of the valve 35 presses against the sloped upper wall of the sleeve 53 when pressure is applied from the spring 97 which tends to seat the valve 35. Tight closing of the valve is assured by the O rings held in the circular recess immediately below the valve top whenever the spring force is adequate to close the valve. However, when fluid is introduced to the sump under pressure and when the various filters are in a clean state and no accumulation of any substantial amount of contaminants has occurred therein, it can be appreciated that, while slight pressure drops will occur through the filter and the tubular member, as well as the entrance port, generally speaking, the fluid pressure available in the valve chamber 33 is not substantially less than the inlet pressure. So considered, pressure applied on the generally conically shaped under wall surface of the poppet valve 35, will be adequate to lift the valve off its seat to permit fluid to flow around the valve and into the outlet chamber 17, from which chamber, through the outlet port 19, it can be supplied to any utilization apparatus.

The O rings 105 are retained in position about the valve due to the recess arrangement into which they fit generally holding them positioned, it being borne in mind that when the valve is not raised to any substantial extent from its seat and the O ring is larger in diameter than the opening in the sleeve.

For the conditions expressed, the operation with the sump 23 attached to the body section 15 would be normally that of drawing fluid from the inlet port 11 through tubes 31, chamber 33 and past valve 35 to the outlet port 19, while subjecting it to a filtering action in the filter sections 21. In this operation the pressure of fluid in the chamber 33 unseats the valve 35 (against the force of spring 97 to close it) to provide an open fluid path to the outlet.

For conditions where substantial amounts of contaminants are collected by the filtering components 21, the pressure drops which occurs between the inlet chamber 13 and the chamber 17 is large so that the fluid pressure at the outlet becomes substantially less than that at the inlet. Such substantial reductions in pressure usually mean that the outlet supply pressure may not be adequate for the untilization equipment supplied therefrom. It is important, in order to provide for the operator ready indications of the operating conditions, that an indicating mechanism of the character particularly depicted by FIGS. 2 and 4 be included within the casing 15. To this end there is a transverse passage 109 of generally circular form extending through the valve and having a communicating tube or passage 111 leading into the inlet chamber 13 and a similar communicating passage 113 leading into the outlet chamber 17 shown in dotted outline in FIG. 1, but actually formed of the line of section. An operating valve mechanism of the character depicted in section, particularly by the structure of FIG. 2, is included in the transverse circular passageway 109.

Referring now particularly to the form of structure shown by FIGS. 2 and 4, the communicating passage 111 from the inlet chamber 13 leads into the inner chamber region 121 of a valve cylinder 122 formed internally of the plug member 123. The plug 123 is adapted to fit within the upper portion 124 of the main body and to be threaded internally into one end of the transverse passage 109. As the plug member 123 is preferably used it is formed with a cylindrical opening 122 extending completely therethrough and enlarging slightly in the regions 125 and 126 and narrowing in the regions 127 and 128. This construction permits the positioning in the recess of a piston-like member 129 having a smaller diameter stem 130 protruding through the smaller diameter regions 127 and 128. The stem has an outer diameter approximately a size corresponding to the diameter of the openings so that it may be positioned within the O-ring 131 and fitted within the enlarged region 126 of the plug. The O-ring then forms a tight seal and the enlarged region 125 forming a part of a dash-pot into which and through which the stem 130 is adapted to move.

The piston-like member 129 has its forward portion formed as a pair of curved cantilever arms 132 and 133 which are provided at their outermost end 134 with a slightly sloped or curving termination. This termination overhangs slightly the outer end 135 of the plug member 123, as can be seen more particularly from the sectional view of FIG. 4. Also positioned within the transverse passage 109 there is a piston member 140, the inner end 141 of which is of reduced cross-sectional area and joins to the main piston 140 by way of a sloped shoulder section 142 and a section having a diameter corresponding substantially to the internal diameter of the overhanging portion of the piston-like member 129 in the form of the cantilever arms 132 and 133. This member then terminates in an abutting shoulder 143 which comes to rest against the outer end of the slightly turned portion 134 of the cantilever arms. The opposite end of the piston 140 is pressed against a cap 145 about an extension of which the coiled spring member 146 is positioned and which is adapted at its outer end to fit over a raised section 147 of an end plug 148 adapted to fit into the upper portion 15 of the casing and to be threadedly attached thereto at 149 so as to close the opposite end of the passage 109 from that which is closed by the plug 123. When the plug 148 is tightened into the casing the spring member 146 is compressed and tends to force the cap 145 against the piston 140 so as to move it internally of the cantilever arms.

Through the transverse passage 109 by way of the inlet passage 111 and the chamber area 121 of the valve fluid under the maximum pressure available in the system is supplied. This fluid is supplied under pressure which is then effective (looking at FIGURE 2 illustratively) against the outer end 141 of the piston 140, as well as the sloped sides 142, and tends to force the piston downwardly (looking at FIG. 2) and outwardly from the ends of the cantilever arms 132 and 133. However, at the same time, fluid at the pressure available in the outlet chamber 35 is supplied into the region 151 within the plug 148 so as to become available to aid the spring member 146 to move the piston 140 in a direction to hold the cantilever arms 132 and 133 spread apart and in overlapping relationship to the outer edge 135 of the plug 123.

For a normally operating state the force exerted on the piston 140 to hold it in a position to maintain the cantilever arms spread apart, when the force is considered to be the sum of the pressure available in the outlet chamber 35 and that exerted by the spring 146, this can be seen to be sufficient to overcome the high pressure available through the passage 111 and acting behind the piston 140. However, if pressure drops occur throughout the filter proper so that the pressure in the outlet chamber 35 is materially reduced, it can be appreciated that the piston 140 with high pressure acting against the end 141 and the sloping side walls 142 tend to move against the force of the spring 146 so that its sloping sides move out and beyond the outwardly turned ends 134 of the cantilever arms 132 and 133. At this time the high pressure available through the inlet 111 and supplied into the chamber 121 is then able not only to act upon the portion 129 of the piston but also upon the outer ends 134 of each cantilever arm. Accordingly, the force acting upon the cantilever arms and the piston is sufficient to force the outer ends of the arms inwardly toward each other and permit the assembly then to move in a direction such that the stem 130 moves outwardly and indicates a failure within the system so that it becomes evident that the sintered filter elements 21 have screened from the supplied fluid contaminants of a quantity sufficient materially to affect fluid flow through to the outlet.

The stem 130 may then, of itself, provide the indication of the condition prevailing within the filter or, alternatively, the stem as it moves outwardly may contact an alarm element, illustratively operating through a switch (not shown) which is closed by the stem or there may be an alarm provided through the ringing of a bell, the lighting of a light, or some other appropriate form of indication.

Resetting of the control element cannot conveniently be arranged unless pressure equalization is established within the mechanism so that the pressure within the region 121 essentially corresponds to that available in the region 151. Consequently, a pressure equalizing bleed plug 160 has been provided. The plug 160 is of generally conical form. It is formed usually of a suitable plastic composition which illustratively may be that composition known in the art as "Teflon" which is hard, yet pliable, and not subject to a great deal of wear. The conical plug is adapted to sit within a conical recess 161 formed within the upper portion 15 of the filter casing.

Leading into the conical recess are two inlet tubes 162 and 163, respectively, the former leading to the high pressure area and the latter leading to the low pressure area and both passages terminating in the conical wall of the recess 161. The plug 160 is formed with a shoulder 165 between its ends and is rested or positioned and held within a recess 166 formed in an equalizing plug 167 which threads into the upper portion 15 of the housing. Each of the plugs 160 and the equalizing plug 167 has a central opening 168 and 169, respectively, arranged in alignment with respect to each other so that there is a passage through them to the atmosphere through the end 170 of the pressure equalizing plug. Accordingly, with a loosening of the equalizing plug 167 by turning the knurled or square-shaped (or other contour) end 171, the end plug 161 is withdrawn from its seating position within the conical recess 161 so that pressure available in the passages 162 and 163 may act upon the lower surface thereof and then provide a communication between each other around the plug and through the atmosphere, through the aligned passageways 168 and 169. This occurring, it can be seen that shortly after releasing the equalizing plug 167 by turning it it becomes possible to equalize pressure on either side of the piston 140, and this being done, the mechanism may be reset to the position indicated by FIG. 2 by depressing the stem 130 (that is, moving it inwardly) so that the outer ends of the cantilever arms 132 and 133 are forced over the shoulders 142 of the piston and caused to overlap the ends 135 of the plug 123, after which the operation may be repeated.

Various modifications of the structure shown may be made without departing from the spirit and scope of this invention.

Having now described the invention, what is claimed and desired to be secured by Letters Patent is the following:

1. In a filtering apparatus, the combination of a filter casing, an inlet port and chamber in the filter casing, an outlet port and chamber in the filter casing, a partition in the casing separating said inlet chamber from said outlet chamber so as to provide isolation therebetween, a cluster of hollow filter elements, means attaching said cluster to the casing and including an inlet passage communicating between the inlet chamber and the exterior of the filter elements in said cluster and an outlet passage communicating between the outlet chamber and the interior of the filter elements and a sealed enclosure surrounding said cluster, whereby a fluid path is formed between the inlet chamber and the outlet chamber through the filter elements, a valve disposed in the outlet passage, means for actuating the valve to close the outlet passage when the pressure differential between the inlet chamber and the outlet chamber is greater than a preselected magnitude which indicates clogging of the filter elements, a transverse passage formed in the casing, means forming a first communicating passage extending from the inlet chamber and opening into the transverse passage, means forming a second communicating passage extending from the outlet chamber and opening into the transverse passage at a point transversely displaced from said first communicating passage opening, a first piston member disposed in the transverse passage so as to be disposed intermediate between the first communicating passage opening and the second communicating passage opening, means for normally urging the first piston member in the direction of the first communicating passage opening, a second piston member disposed in the transverse passage so that the first communicating passage opening is intermediate between the first and second piston members, said second piston member having an indicator portion extending externally of the casing, locking means for normally holding the second piston member in a position adjacent the first communicating passage opening, release means operable upon a preselected magnitude of movement of the first piston member toward the second communicating passage opening in response to the pressure differential existing between the inlet chamber and outlet chamber resulting from clogging of the filter elements to release said locking means so as to cause the second piston member to move to a position remote from said first communicating passage opening in response to the inlet chamber pressure, and means sealing the first and second piston members in the transverse passage.

2. Apparatus according to claim 1 and including venting means to facilitate resetting of the second piston member in its locked disposition comprising a venting valve consisting of a conical plug having an atmospheric vent passage extending longitudinally therethrough, a conical venting valve seat formed in the casing, and means for holding the valve plug in sealed mating engagement with the valve seat, first venting passage means extending between the inlet chamber and the valve seat, second venting passage means extending between the outlet chamber and the valve seat, and means for selectively breaking the sealed engagement of the valve plug and valve seat so as to initiate simultaneous communication between the first and second venting passage means and the atmospheric vent passage, whereby pressures in the inlet and outlet chambers are equalized when the sealed engagement is broken.

3. Apparatus according to claim 2 and in which the locking means includes a pair of cantilever arms extending from the second piston member toward the first piston member so as to contact the outer surface thereof and having terminations held by said first piston member in a locking recess formed in the transverse passage, and the release means includes a reduced cross-sectional area portion of the first piston member adjacent the second piston member, contact with which by the cantilever arms permits the terminations to withdraw from the recesses.

4. A differential pressure indicator for use with a filter comprising a housing having a transverse passage therewithin, a first piston member disposed wtihin the transverse passage, a locking recess formed in the passage so as to encircle the first piston member, a second piston member disposed within the transverse passage remote from the first piston member and having a cantilevered locking member extending toward and in contact with the first piston member so as normally to be held in the locking recess thereby, means for sealing the transverse passage, a first differential pressure passage extending between a first fluid source and the transverse passage so as to open thereinto between the first and second piston members, a second differential pressure passage extending between a second fluid source and the transverse passage so as to open thereinto at a point such that the first piston member is intermediate between the second differential pressure passage opening and the first differential passage opening, means for urging the first piston member toward the second piston member, and means operable in response to a preselected magnitude of movement of the first piston member away from the second piston member in response to a pressure differential existing between the first and second pressure differential passages to initiate the release of the cantilevered locking member from the locking recess and permit the second piston member to move away from the first piston member and locking recess, and an indicator member formed on the second piston member so as to be remote from the cantilevered locking member and extend through the housing, whereby, upon the release of the cantilevered locking member from the locking recess and movement of the second piston member therefrom, the portion of the indicator extending through the housing so as to project therebeyond is increased.

5. Apparatus according to claim 4 and including venting means to facilitate resetting of the indicator comprising a venting valve consisting of a conical plug having an atmospheric vent passage extending longitudinally therethrough, a conical venting valve seat formed in the housing, and means for holding the valve plug in sealed mating engagement with the valve seat, first venting passage means extending between the first differential pressure passage and the valve seat, second venting passage means extending between the second differential pressure passage and the valve seat, and means for selectively breaking the sealed engagement of the valve plug and valve seat so as to initiate simultaneous communication between the first and second venting passage means and the atmospheric vent passage, whereby pressures in the first differential pressure passage and second differential pressure passage are equalized when the sealed engagement is broken.

References Cited in the file of this patent

UNITED STATES PATENTS

| | | |
|---|---|---|
| 2,367,873 | Kasten | Jan. 23, 1945 |
| 2,418,777 | Le Clair | Apr. 8, 1947 |
| 2,431,782 | Walton et al. | Dec. 2, 1947 |
| 2,454,982 | Wallace | Nov. 30, 1948 |
| 2,544,244 | Vokes | Mar. 6, 1951 |
| 2,572,981 | Briggs | Oct. 30, 1951 |
| 2,633,098 | Ellis | Mar. 31, 1953 |
| 2,669,707 | Ehrman | Feb. 16, 1954 |
| 2,767,851 | Muller | Oct. 23, 1956 |
| 2,773,602 | Sylvester | Dec. 11, 1956 |
| 2,878,936 | Scavuzzo et al. | Mar. 24, 1959 |
| 2,879,892 | Frakes | Mar. 31, 1959 |
| 2,932,400 | Scavuzzo | Apr. 12, 1960 |
| 2,935,040 | Steensen | May 3, 1960 |
| 2,954,751 | Barnes | Oct. 4, 1960 |

FOREIGN PATENTS

| | | |
|---|---|---|
| 523,919 | Great Britain | July 25, 1940 |
| 774,098 | Great Britain | May 1, 1957 |
| 787,870 | Great Britain | Dce. 18, 1957 |